(12) United States Patent
Guo et al.

(10) Patent No.: US 8,629,649 B2
(45) Date of Patent: Jan. 14, 2014

(54) BATTERY CHARGING APPARATUS WITH A COMMON CONTROL LOOP FOR A LOW DROP-OUT VOLTAGE REGULATOR AND A BOOST REGULATOR

(75) Inventors: Guoyong Guo, Santa Clara, CA (US); Dan Nie, Chengdu (CN)

(73) Assignee: O2Micro International, Ltd., Georgetown (KY)

( * ) Notice: Subject to any disclaimer, the term of this patent is extended or adjusted under 35 U.S.C. 154(b) by 324 days.

(21) Appl. No.: 13/182,765

(22) Filed: Jul. 14, 2011

(65) Prior Publication Data

US 2013/0015810 A1  Jan. 17, 2013

(51) Int. Cl.
  *H02J 7/00* (2006.01)
(52) U.S. Cl.
  USPC ............................................. 320/107
(58) Field of Classification Search
  USPC ............................................. 320/107
  See application file for complete search history.

(56) References Cited

U.S. PATENT DOCUMENTS

| 7,282,895 | B2 * | 10/2007 | Thiele et al. | 323/266 |
| 7,459,886 | B1 * | 12/2008 | Potanin et al. | 320/135 |
| 7,977,913 | B2 * | 7/2011 | Tan et al. | 320/112 |
| 7,977,921 | B2 * | 7/2011 | Bahai et al. | 320/140 |
| 8,159,181 | B2 * | 4/2012 | Greyling | 320/107 |
| 2003/0193318 | A1 * | 10/2003 | Ozawa et al. | 320/132 |
| 2007/0279018 | A1 | 12/2007 | Sumitomo et al. | |
| 2008/0052550 | A1 | 2/2008 | Ozawa et al. | |
| 2008/0169706 | A1 * | 7/2008 | Onishi et al. | 307/104 |
| 2009/0278506 | A1 * | 11/2009 | Winger et al. | 320/160 |
| 2011/0273132 | A1 * | 11/2011 | Khaitan et al. | 320/101 |

FOREIGN PATENT DOCUMENTS

| JP | 2007323376 A | 12/2007 |
| JP | 2008054368 A | 3/2008 |
| JP | 2008187785 A | 8/2008 |
| JP | 2009153265 A | 7/2009 |

OTHER PUBLICATIONS

Japanese Office Action dated Aug. 7, 2013 issued in corresponding Japanese Patent Application No. 2012-105205 (3 pages).

* cited by examiner

*Primary Examiner* — Arun Williams
(74) *Attorney, Agent, or Firm* — Wang Law Firm, Inc.; Li K. Wang; Stephen Hsu

(57) ABSTRACT

A flexible dual mode battery charger that charges a battery in two different modes, depending on the difference between the adapter voltage and the battery voltage, with a smooth transition between these two modes and the charging current remains relatively constant during the transition is provided in this application. At a lower battery level, the dual mode battery charger charges the battery as a LDO charger and when battery voltage is very close to the adapter voltage, the charger migrates its operating mode from the LDO mode to the boost mode and charges the battery as a boost charger. This flexible battery charger uses one common control circuit for controlling the operations of the LDO charger and the boost charger. The switching operation from one operation mode to other operation mode is smooth.

13 Claims, 4 Drawing Sheets

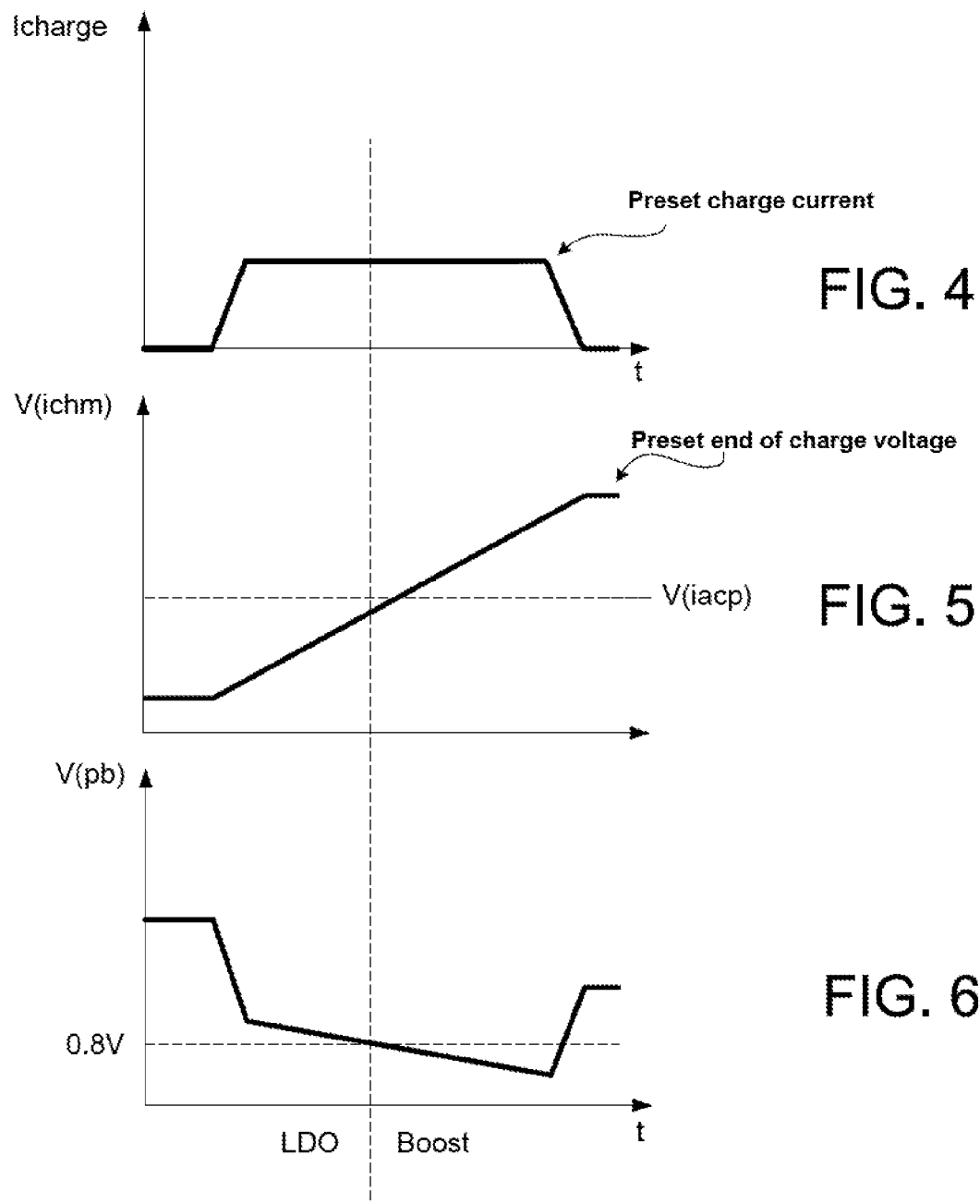

BATTERY CHARGING APPARATUS WITH A COMMON CONTROL LOOP FOR A LOW DROP-OUT VOLTAGE REGULATOR AND A BOOST REGULATOR

BACKGROUND OF THE INVENTION

1. Field of the Invention

The present invention relates to a battery charging apparatus and in particular to a battery charging apparatus that provides a smooth transition between two different charging modes.

2. Description of Related Art

Currently, the increasing demand for higher performance power supply circuits has resulted in a continued development of voltage regulator devices. Many low voltage applications, such as for use in cell phones, pagers, laptops, camera recorders and other mobile battery operated devices, require the use of low drop-out (LDO) voltage regulators.

The LDO voltage regulators generally can provide a well-specified and stable DC voltage whose input to output voltage difference is low. The LDO voltage regulators are usually configured for providing the power requirements to electrical circuits. The LDO voltage regulators typically have an error amplifier, and a pass device, e.g., a power transistor. These two components are coupled in series. The error amplifier is coupled to an input terminal of the LDO voltage regulators, and the pass device is coupled to an output terminal of the LDO voltage regulators. The pass device can then drive an external load. However, the LDO voltage regulator loses its efficiency when the voltage of the battery that is being charged increases and the difference between the input-output voltages at the LDO voltage regulator drops.

Another regulator commonly used to provide DC current to electronic devices is boost regulator. It is a class of switching-mode power supply containing at least two semiconductor switches and at least one energy storage element. The boost regulator is capable of delivering an output DC voltage greater than its input DC voltage and it is particularly useful for battery charging operation when the voltage of the battery that is being charged is higher.

It would be desirable to have a battery charging device that combines the quality of a LDO voltage regulator and a boost regulator and capable of delivering an output voltage that is higher than the input voltage at the same time smoothly switches operation between these two types of regulators.

SUMMARY OF THE INVENTION

In one embodiment, the invention is a dual mode charger that charges a battery in two different modes and transitions between two modes while maintaining the charging current fairly constant. The dual mode charger includes a control circuit, a boost circuit, and a low dropout circuit. The boost circuit is in communication with the control circuit and receives an input current from an input source. The boost circuit enables the dual mode charger to operate in a boost mode. The low dropout circuit is in communication with the control circuit and the boost circuit. The low dropout circuit outputs a charge current to the battery and enables the dual mode charger to operate in a low dropout mode. The control circuit monitors the input current and the charge current and controls the boost circuit and low dropout circuit simultaneously. The control circuit also maintains the charge current constant while the dual mode charger switches from the low dropout mode to the boost mode.

In another embodiment, the invention is a dual mode charger that comprises a control circuit, a boost circuit in communication with the control circuit, and a low dropout circuit in communication with the control circuit and the boost circuit. The low dropout circuit outputs a charge current to the battery. The control circuit controls the boost circuit and low dropout circuit simultaneously. The dual mode charger switches charging operation between the boost circuit and the low dropout circuit while maintaining constant the charge current.

In yet another embodiment, the invention is a method for charging a battery using a dual mode charger. The method comprises enabling the dual mode charger to operate in a low dropout mode, outputting a charge current to the battery, comparing a voltage of the battery with a voltage of a charge adapter, and switching the dual mode charger from the low dropout mode to a boost mode while maintaining constant the charge current, if the voltage of the battery is approximately the same as the voltage of the charge adapter.

BRIEF DESCRIPTION OF THE DRAWINGS

Advantages of the present invention will be apparent from the following detailed description of exemplary embodiments thereof, which description should be considered in conjunction with the accompanying drawings, in which:

FIGS. 4-6 are graphics of different voltages and currents that illustrate the operation of the present invention;

DETAIL DESCRIPTION OF THE INVENTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

The present invention provides a flexible dual mode battery charger that charges a battery in two different modes, depending on the voltage level of the battery, with a smooth transition between these two modes and the charging current remains relatively constant during the transition. At a lower battery level, the dual mode battery charger charges the battery as a LDO charger and when the battery voltage is very close to the adapter voltage, the charger migrates its operating mode from the LDO mode to the boost mode and charges the battery as a boost charger. This flexible battery charger uses one common control circuit for controlling the operations of the LDO charger and the boost charger, instead of using two independent control circuits, one for the LDO charger and one for the boost charger. Because of the common control circuit, the switching operation from one operation mode to other operation mode is smooth and gradual. The switching operation is automatic and triggered by the difference between the adapter voltage and the battery voltage.

Figure 1:
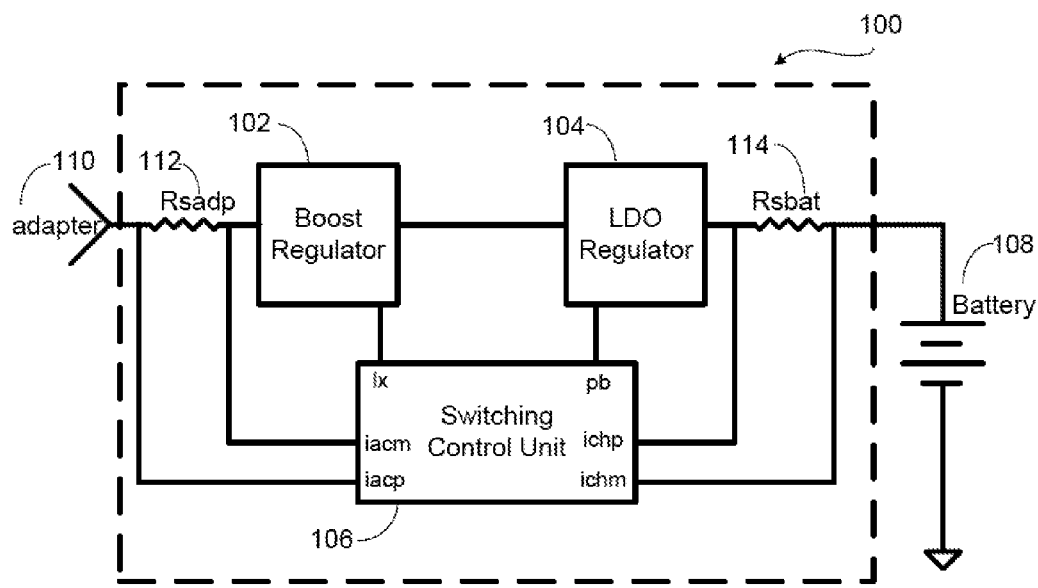
FIG. 1 is a block diagram of the present invention.

FIG. 1 illustrates a block diagram of a flexible battery charger 100 according to the present invention. The battery charger 100 has a boost charger (also known as boost regulator) 102, a LDO charger (also known as LDO regulator) 104, and a switching control unit 106. The battery charger 100 may also include an adapter resistor 112 for measuring the incoming current and a battery resistor 114 for measuring the charge current. The switching control unit 106 controls the operation of both boost charger 102 and LDO charger 104. The switching control unit 106 monitors the input current from a current source, which can be an adapter 110, and the charge current flowing to the battery 108. The boost charger 102 receives an input voltage and the LDO charger 104 outputs the charge current to the battery 108. Initially the battery charger 100 charges the battery 108 in a LDO charging mode. When the voltage of the battery 108 increases, the switching control unit 106 increases the operation of the LDO charger 104 to maintain the charging current delivered to the battery 108. As the voltage of the battery 108 continues to increase, the switching control unit 106 turns on the boost charger 102 to charge the battery 108 in the boost charging mode. The switching control unit 106 monitors the voltage of the battery 108 through monitoring port ichm and the voltage from the adapter 110 through monitoring port iacp.

Figure 2:
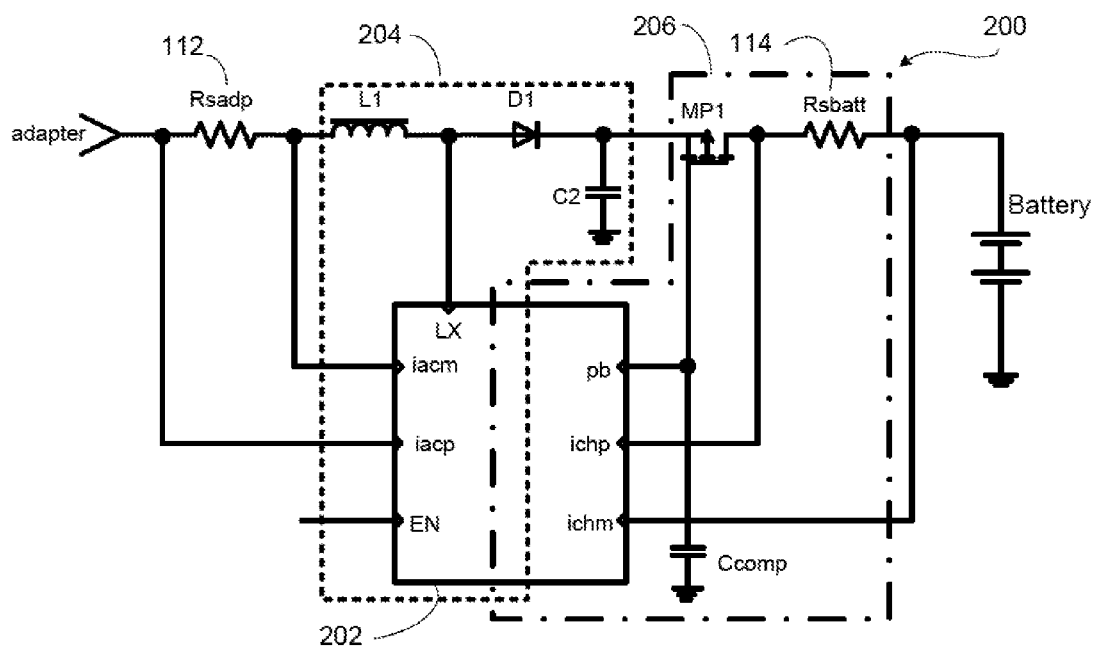
FIG. 2 is a circuit schematic of the present invention.

FIG. 2 is a circuit schematic 200 of the battery charger 100 according to one embodiment of the present invention. The controller 202 controls the operations of a LDO circuit 206 and a boost circuit 204. The LDO circuit 206 corresponds to the LDO charger 104 and the boost circuit 204 corresponds to the boost charger 102. The LDO circuit 206 and the boost circuit 204 are delineated by different dashed lines and the controller 202 are covered partially by both the LDO circuit 206 and the boost circuit 204 to symbolize that the controller 202 are shared by two chargers. The controller 202 may be implemented as a single chip device and may also be implemented in the same chip along with the boost charger 102 and the LDO charger 104. The controller 202 is enabled through enabling point EN and controls simultaneously the operations of the LDO charger 104 and the boost charger 102. The control of the power transistor in the LDO charger 104 is done by the controller 202 through voltage Vpb. The control of the "switching" aspect of the boost charger 102 is done by the controller 202 through switching point LX.

Figure 3:
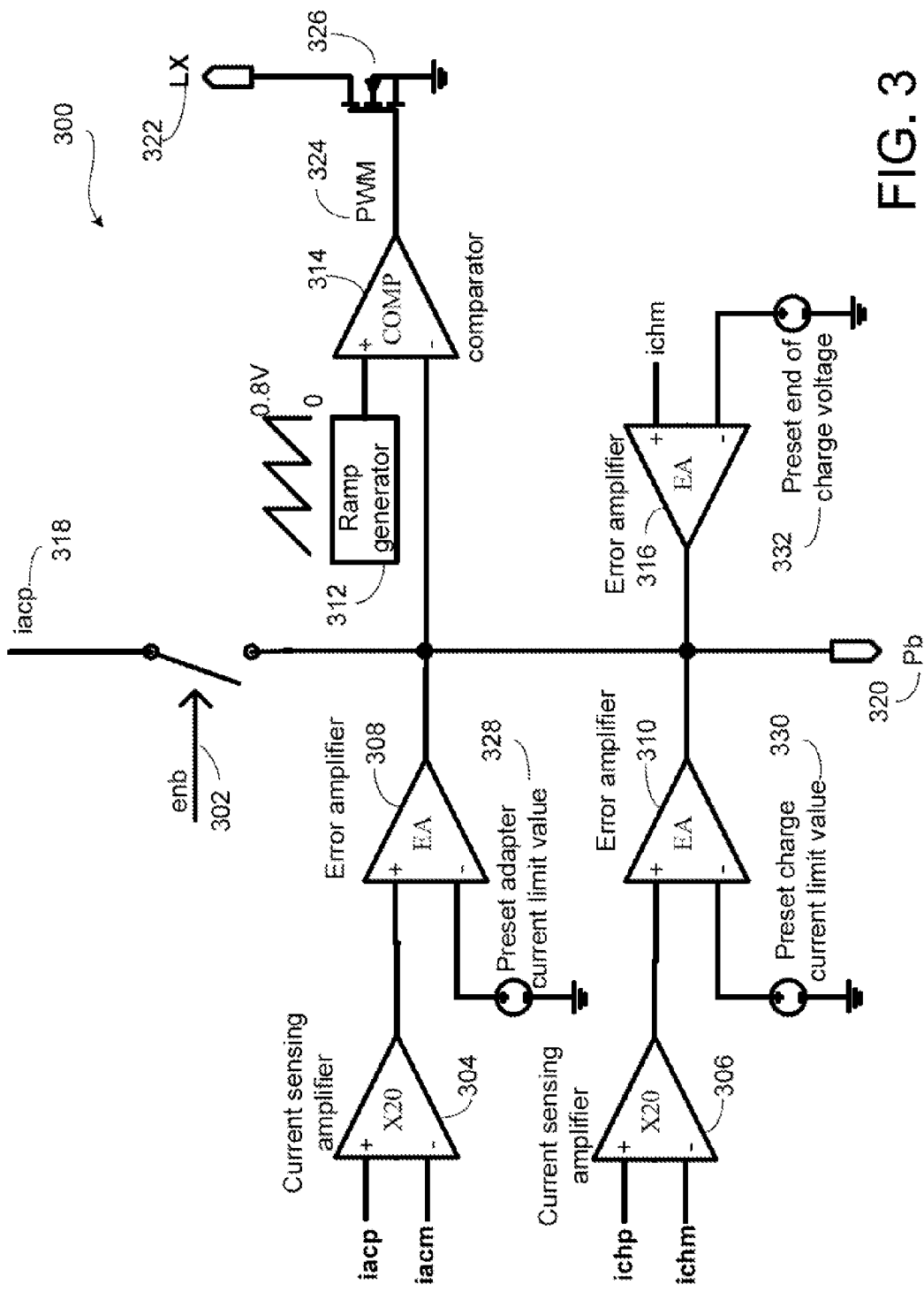
FIG. 3 is a detail circuit schematic of the present invention according to one embodiment of the invention.

FIG. 3 is a detail circuit schematic 300 of the battery charger 100 according to one embodiment of the present invention. The battery charger 100 is enabled through enb point 302 (shown as EN on FIG. 2). Before the battery charger 100 is enabled, pb point 320 is short to iacp point 318 and the LDO charger 104 remains in the OFF condition and the charging current Icharge flowing to the battery 108 is zero as shown in FIG. 4.

After the battery charger 100 is enabled, an input current flows through resistor Rsadp 112 and the current 'V(iacp, iacm)/Rsadp' passes through a current sensing amplifier 304. The resulting voltage from the current sensing amplifier 304 is compared at an error amplifier 308 with a preset adapter current limit value 328 and the output voltage from the error amplifier 308 drives the Vpb which controls PMOS FET MP1 shown in FIG. 2.

The voltage Vpb 320 is also affected by the output of error amplifier 310. The charging current sensed by Rsbat 114 passes through a current sensing amplifier 306, and the resulting voltage is compared at the error amplifier 310 with a preset charge current limit value 330. As it can be seen from FIGS. 4, 5, and 6, as the battery voltage Vichm increases with charging (FIG. 5), voltage Vpb decreases (FIG. 6), while the charging current Icharge (FIG. 4) is maintained substantially constant.

After the battery being charged for awhile and the battery voltage Vichm increases to roughly the same voltage as the adapter's voltage Viacp, continuing decrease of Vpb will no longer be effective to charge the battery 108. At this point, the booster mode of the battery charger 100 starts to dominate. As Vpb decreases to less than a predefined level, e.g. 0.8 V, the output of the comparator 314 becomes effectively a pulse-width modulation (PWM) signal and this PWM signal controls NMOS FET 326, which acts like a switch to the boost charger 102. The comparator 314 takes as input Vpb and a ramp signal generated by a ramp signal generator 312.

The battery voltage Vichm increases during the charge process. When the battery voltage Vichm reaches a preset end of charge voltage 332, the output of the error amplifier 310 increases the Vpb 320. The charge current Icharge decrease as the Vpb 320 increases. If the Vpb 320 increases above the ramp range (higher than 0.8V) as shown in FIG. 6, the charge process stops.

Figure 7:
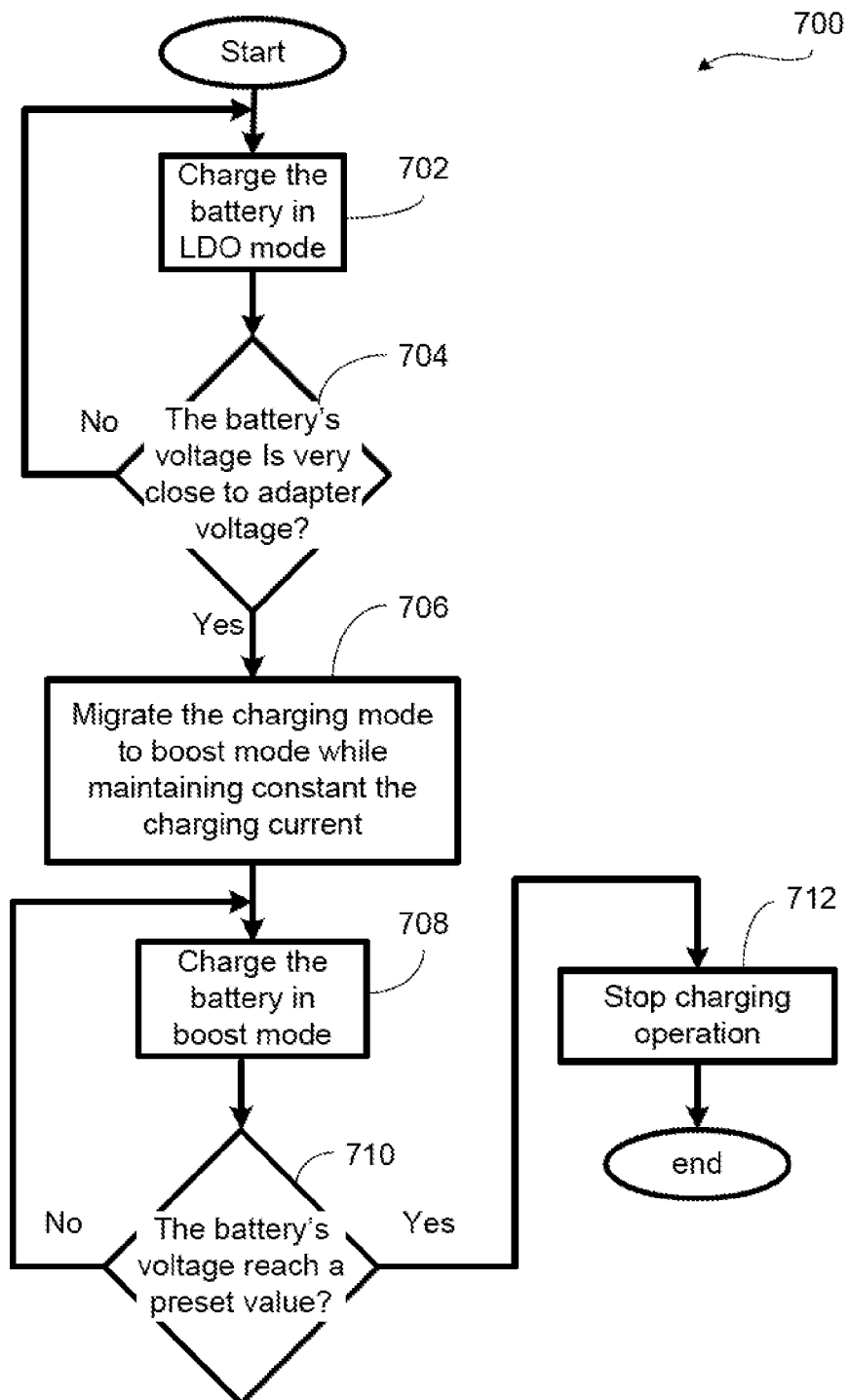
FIG. 7 is a flow chart for the charging operation of a battery according to one embodiment of the present invention.

FIG. 7 is a flowchart 700 of charging operation of a battery according to one embodiment of the invention. After the battery is connected to a dual mode charger of the present invention, the dual mode charger charges the battery in the LDO mode, step 702. While the battery is connected to the dual mode charger, the battery's voltage is constantly checked, step 704. When the battery's voltage is very close to the adapter voltage, the dual mode charger starts to charge the battery in the boost mode, step 706. The charging current maintains constant while the charging mode of the dual mode charger migrates from the LDO mode to the boost mode. While the battery is charged in the boost mode, step 708, the battery's voltage is compared with a preset value, step 710, e.g. the end of charge voltage. While the battery's voltage is less than the preset value, the battery continues to be charged in the boost mode, step 708. When the battery's voltage reaches the preset value, the charging operations stops, step 712.

In operation, a user may connect the battery charger 100 connected to an adapter 110 to a battery 108 depleted of charge. The battery charger 100 will initially charge the battery as a LDO charger until the voltage of the battery increases to approximately the same as the voltage of adapter 110, then the battery charger 100 starts to operate as a booster charger 102 until the battery 108 reaches a preset end of charge voltage. Because of a common control loop in the present invention, the switching from operating as a LDO charger 104 to operating as a booster charger 102 is smooth, gradual, and automatic.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is as follows:

1. A dual mode charger, for charging a battery, comprising:
   a control circuit;

a boost circuit in communication with the control circuit and receiving an input current from an input source, the boost circuit enabling the dual mode charger to operate in a boost mode; and a low dropout circuit in communication with the control circuit and the boost circuit, the low dropout circuit outputting a charge current to the battery, the low dropout circuit enabling the dual mode charger to operate in a low dropout mode, wherein the control circuit monitors the input current and the charge current, controls the boost circuit and low dropout circuit simultaneously, and maintains the charge current constant while the dual mode charger switches from the low dropout mode to the boost mode.

2. The dual mode charger of claim 1 further comprising:
a first resistor placed between the input source and the boost circuit; and
a second resistor placed between the battery and the low dropout circuit.

3. The dual mode charger of claim 1, wherein the control circuit further comprising:
a first current sensing amplifier for sensing the input current; and
a second current sensing amplifier for sensing the charge current.

4. The dual mode charger of claim 1, wherein the control circuit further comprising:
a ramp signal generator for generating a ramp signal; and
a comparator for comparing the ramp signal with an internal voltage and generating a pulse-width modulation signal according to a result of comparison.

5. A dual mode charger, for charging a battery, comprising:
a control circuit;
a boost circuit in communication with the control circuit; and
a low dropout circuit in communication with the control circuit and the boost circuit, the low dropout circuit outputting a charge current to the battery;
wherein the control circuit controls the boost circuit and low dropout circuit simultaneously, the dual mode charger switches charging operation between the boost circuit and the low dropout circuit while maintaining constant the charge current.

6. The dual mode charger of claim 5, wherein the boost circuit receives an input current from a input current source.

7. The dual mode charger of claim 5, wherein the control circuit generates an internal voltage for controlling simultaneously operations of the boost circuit and the low dropout circuit.

8. The dual mode charger of claim 5, wherein the control circuit generates a pulse-width modulation signal for controlling the boost circuit.

9. The dual mode charger of claim 8, wherein the control circuit generates the pulse-width modulation signal when an internal voltage drops lower than a predetermined level.

10. The dual mode charger of claim 5, wherein the control circuit switches the charging operation to the boost circuit when the voltage of the battery is the same as an input voltage.

11. A method for charging a battery, using a dual mode charger, comprising the steps for:
enabling the dual mode charger to operate in a low dropout mode;
outputting a charge current to the battery;
comparing a voltage of the battery with a voltage of a charge adapter; and
switching the dual mode charger from the low dropout mode to a boost mode while maintaining constant the charge current, if the voltage of the battery is approximately the same as the voltage of the charge adapter.

12. The method for charging a battery of claim 11, further comprising the step for receiving an input current from the charger adapter.

13. The method for charging a battery of claim 11, further comprising:
comparing the voltage of the battery with an end of charge voltage; and
stopping the dual mode charger from charging the battery.

* * * * *